United States Patent
Lee (10) Patent No.: US 12,319,169 B2
(45) Date of Patent: Jun. 3, 2025

(54) METHOD OF PREVENTING OUTPUT LIMIT OF BATTERY OF VEHICLE

(71) Applicants: Hyundai Motor Company, Seoul (KR); Kia Corporation, Seoul (KR)

(72) Inventor: Jung Hyun Lee, Whasung-Si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 18/528,316

(22) Filed: Dec. 4, 2023

(65) Prior Publication Data

US 2024/0383374 A1     Nov. 21, 2024

(30) Foreign Application Priority Data

May 19, 2023   (KR) .................. 10-2023-0065076

(51) Int. Cl.
    *B60L 58/24*       (2019.01)
    *B60L 3/00*        (2019.01)
    *B60L 50/60*       (2019.01)
    *B60L 58/14*       (2019.01)

(52) U.S. Cl.
    CPC ............. *B60L 58/14* (2019.02); *B60L 3/0046* (2013.01); *B60L 50/60* (2019.02); *B60L 58/24* (2019.02)

(58) Field of Classification Search
CPC .. B60L 58/14; B60L 3/00; B60L 50/60; B60L 58/24
See application file for complete search history.

(56) References Cited

U.S. PATENT DOCUMENTS

| | | | |
|---|---|---|---|
| 11,501,583 B2* | 11/2022 | Chen | H01M 10/48 |
| 2022/0024323 A1* | 1/2022 | Kresse, III | B60W 10/04 |
| 2022/0194255 A1* | 6/2022 | Hartnagel | G06Q 50/06 |
| 2022/0332196 A1* | 10/2022 | Christen | B60W 10/08 |
| 2023/0020833 A1* | 1/2023 | Jin | B60L 58/26 |
| 2023/0036756 A1* | 2/2023 | Ogawa | B60L 50/15 |
| 2023/0382269 A1* | 11/2023 | Lim | B60L 53/66 |

* cited by examiner

*Primary Examiner* — Jared Fureman
*Assistant Examiner* — Esayas G Yeshaw
(74) *Attorney, Agent, or Firm* — Morgan, Lewis & Bockius LLP

(57) ABSTRACT

A method of preventing output limit of a battery of a vehicle for improving output decrease due to output limit of the battery configured to supply power to a motor for driving the vehicle, includes monitoring a temperature and a state of charge (SOC) value of the battery configured to supply power to a motor configured for driving the vehicle while driving, determining a level of a possibility of occurrence of the output limit of the battery based on a level determination map configured based on the temperature and the SOC value of the battery, and selectively performing control for raising the temperature of the battery according to the determined level of the possibility of occurrence of the output limit of the battery.

16 Claims, 4 Drawing Sheets

FIG. 5

METHOD OF PREVENTING OUTPUT LIMIT OF BATTERY OF VEHICLE

CROSS-REFERENCE TO RELATED APPLICATION

The present application claims priority to Korean Patent Application No. 10-2023-0065076 filed on May 19, 2023, the entire contents of which is incorporated herein for all purposes by this reference.

BACKGROUND OF THE PRESENT DISCLOSURE

Field of the Present Disclosure

The present disclosure relates to a method of preventing output limit of a battery of a vehicle. More particularly, it relates to a method of preventing output limit of a battery of a vehicle for preventing output degradation due to output limit of the battery configured to supply power to a motor for driving the vehicle.

Description of Related Art

An electric vehicle utilizes a motor configured to generate driving force and a battery configured to supply power for driving the motor. In general, an electric vehicle utilizes a packaged battery, that is, a battery pack, and the battery pack includes a plurality of battery modules.

The battery has a problem in that output performance at a low temperature is degraded depending on the characteristics of cells included in the battery module. For example, when a voltage of a cell reaches a lower limit voltage, a problem occurs in that discharge output of the battery is limited.

In general, to improve the output limit problem of the battery, a value smaller than an actual state of charge (SOC) is displayed as an SOC value of the battery on a dashboard inside the vehicle to induce early charging of the battery.

However, as the SOC value of the battery decreases even though early charging of the battery is induced as described above, there occurs a problem in that discharge output of the battery is eventually limited.

Accordingly, in a related art, to improve the problem of output limit of the battery, early charging of the battery has been induced by decreasing the SOC value of the battery displayed on the dashboard more rapidly than the actual SOC when a temperature and the SOC value of the battery become predetermined values or less more than before the temperature and the SOC become equal to or less than the predetermined values.

However, in the case of inducing early charging of the battery as in the related art, the problem of degradation in the output performance of the battery at low temperatures cannot be fundamentally solved, and even though available energy of the battery is present, energy of the battery cannot be sufficiently used due to low-temperature characteristics of the battery, and thus there is a problem in that a range of the vehicle is shortened and marketability of the vehicle deteriorates.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method of preventing output limit of a battery of a vehicle, which may prevent discharge output of the battery in a low-temperature state from being limited due to a decrease in SOC.

The object of the present disclosure is not limited to the object mentioned above, and other objects not mentioned herein may be clearly understood by those of ordinary skill in the art to which an exemplary embodiment of the present disclosure belongs from the description below.

Various aspects of the present disclosure are directed to providing a method of preventing output limit of a battery of a vehicle, the method including monitoring a temperature and a state of charge (SOC) value of the battery configured to supply power to a motor for driving the vehicle while driving of the vehicle, determining a level of a possibility of occurrence of the output limit of the battery based on a level determination map configured based on the temperature and the SOC value of the battery, and selectively performing control for raising the temperature of the battery according to the determined level of the possibility of occurrence of the output limit of the battery.

In an embodiment, the level of the possibility of occurrence of the output limit of the battery may be determined as one of a normal level at which there is no possibility of occurrence of the output limit of the battery, a warning level at which there is the possibility of occurrence of the output limit of the battery, and a critical level at which the possibility of occurrence of the output limit of the battery is higher than the warning level, and when the level of the possibility of occurrence of the output limit of the battery is the warning level or the critical level, control for raising the temperature of the battery may be performed. Furthermore, when the level of the possibility of occurrence of the output limit of the battery is the normal level, the control for raising the temperature of the battery may not be performed.

In another exemplary embodiment of the present disclosure, when the level of the possibility of occurrence of the output limit of the battery is the warning level, the control for raising the temperature of the battery may be performed until the temperature of the battery reaches a first target temperature, and when the temperature of the battery reaches the first target temperature, the control for raising the temperature of the battery may be suspended. At the instant time, the first target temperature may be a minimum temperature at which output limit of the battery does not occur based on the same SOC value.

In various exemplary embodiments of the present disclosure, when the level of the possibility of occurrence of the output limit of the battery is the critical level, the control for raising the temperature of the battery may be performed until the temperature of the battery reaches a second target temperature, and when the temperature of the battery reaches the second target temperature, the control for raising the temperature of the battery may be suspended. At the instant time, the second target temperature may be a minimum temperature for preventing a charging speed of the battery from being lower than a predetermined normal speed during charging of the battery.

In various exemplary embodiments of the present disclosure, when the level of the possibility of occurrence of the output limit of the battery is the critical level, output of the motor may be limited to predetermined output or less than the predetermined output.

In still various exemplary embodiments of the present disclosure, the method may further include turning on a charging warning light for selectively warning of a charging state of the battery according to the determined level of the possibility of occurrence of the output limit of the battery when the vehicle is parked. The turning on the charging warning light may include turning on the charging warning light in an operation mode for inducing charging of the battery when the level of the possibility of occurrence of the output limit of the battery is the warning level, and turning on the charging warning light in an operation mode for requesting charging of the battery when the level of the possibility of occurrence of the output limit of the battery is the critical level.

In another exemplary embodiment of the present disclosure, the method may further include monitoring the temperature and the SOC value of the battery when the vehicle is restarted, determining the level of the possibility of occurrence of the output limit of the battery by the level determination map based on the monitored temperature and the monitored SOC value of the battery, and limiting output of the motor to predetermined output or less than the predetermined output upon concluding that the level of the possibility of occurrence of the output limit of the battery is the warning level or the critical level.

In another further embodiment, when the level of the possibility of occurrence of the output limit of the battery determined when the vehicle is restarted is the warning level or the critical level, the control of raising the temperature of the battery may be performed until the temperature of the battery reaches the second target temperature. At the instant time, the second target temperature may be a minimum temperature for preventing a charging speed of the battery from being lower than a predetermined normal speed.

Other aspects and embodiments of the present disclosure are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present disclosure have other features and advantages which will be apparent from or are set forth in more detail in the accompanying drawings, which are incorporated herein, and the following Detailed Description, predetermined which together serve to explain certain principles of the present disclosure.

The above and other features of the present disclosure are discussed infra.

It should be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural or functional descriptions presented in the exemplary embodiments of the present disclosure are only illustrative for describing embodiments according to the concept of the present disclosure, and the exemplary embodiments according to the concept of the present disclosure may be implemented in various forms.

In addition, in an exemplary embodiment of the present disclosure, when a certain part is described as "including" a certain element, this means that another component may be further included rather than excluding another element unless stated otherwise.

Furthermore, in an exemplary embodiment of the present disclosure, even though terms such as "first", "second", etc. may be used to describe various elements, the elements are not limited by these terms. These terms are only used to distinguish one element from another. For example, within the scope not departing from the scope of the rights according to the concept of the present disclosure, a first element may be referred to as a second element, and similarly, the second element may be referred to as the first element.

Hereinafter, embodiments of the present disclosure will be described with reference to the accompanying drawings. Matters expressed in the accompanying drawings may be different from those actually implemented in the drawings schematically illustrated to easily described the exemplary embodiments of the present disclosure.

Various embodiments of the present disclosure relates to a method of preventing output limit of a battery of a vehicle for preventing discharge output from being limited due to a decrease in SOC value of the battery in a low temperature state while driving.

The battery is an energy storage device configured to supply power to a motor that generates a driving force for driving of the vehicle. While driving under low temperature and low load conditions, the temperature insignificantly increases, and the SOC continuously decreases. Thereafter, when the SOC value of the battery is reduced to a predetermined SOC value, the discharge output of the battery is limited, and as a result, the vehicle may suddenly stop during climbing or high-load driving situations.

Accordingly, the present disclosure prevents a situation in which the discharge output of the battery is abruptly limited while driving or starting of the vehicle, ensuring safety of a user as well as increasing driving safety and marketability of the vehicle.

The present disclosure determines a possibility that output limit of the battery will occur (for example, a possibility of output limit of the battery) when the vehicle is driven or restarted, and selectively controls temperature increase of the battery according to a determination result, preventing discharge output of the battery from being abruptly limited.

The present disclosure improves the problem of deterioration of output performance of the battery at low temperatures, and thus does not cause the problem of the related art of shortening the range of the vehicle.

Figure 1:
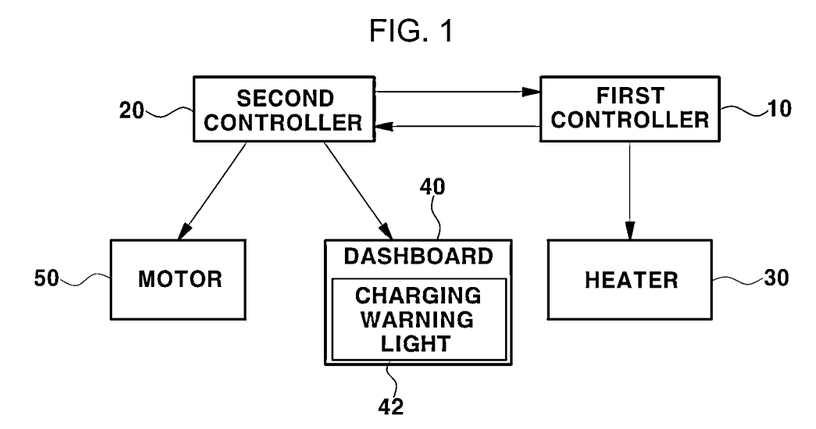
FIG. 1 is a block diagram illustrating a system for executing a method of preventing output limit of a battery of a vehicle according to various exemplary embodiments of the present disclosure.
Figure 2:
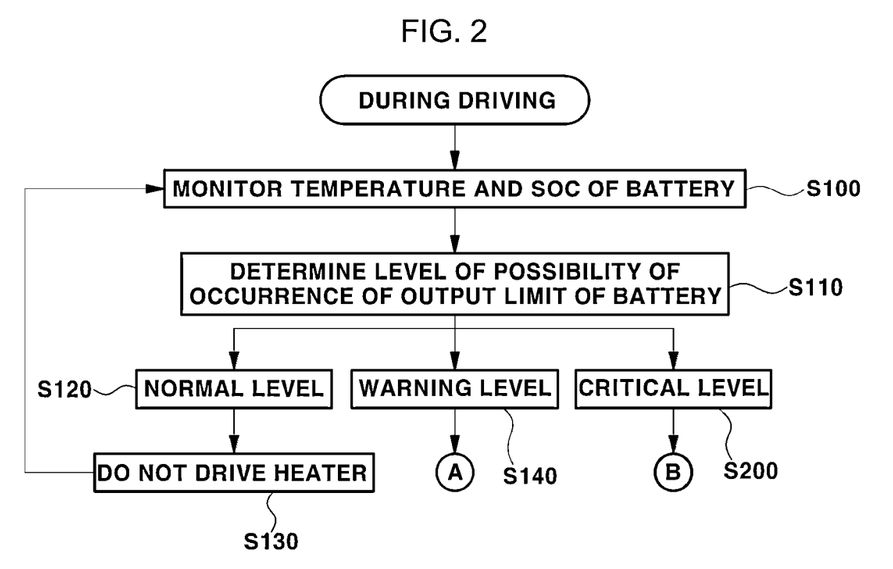
FIG. 2, FIG. 3, FIG. 4 and FIG. 5 are flowcharts illustrating the method of preventing output limit of the battery of the vehicle according to various exemplary embodiments of the present disclosure.
Figure 3:
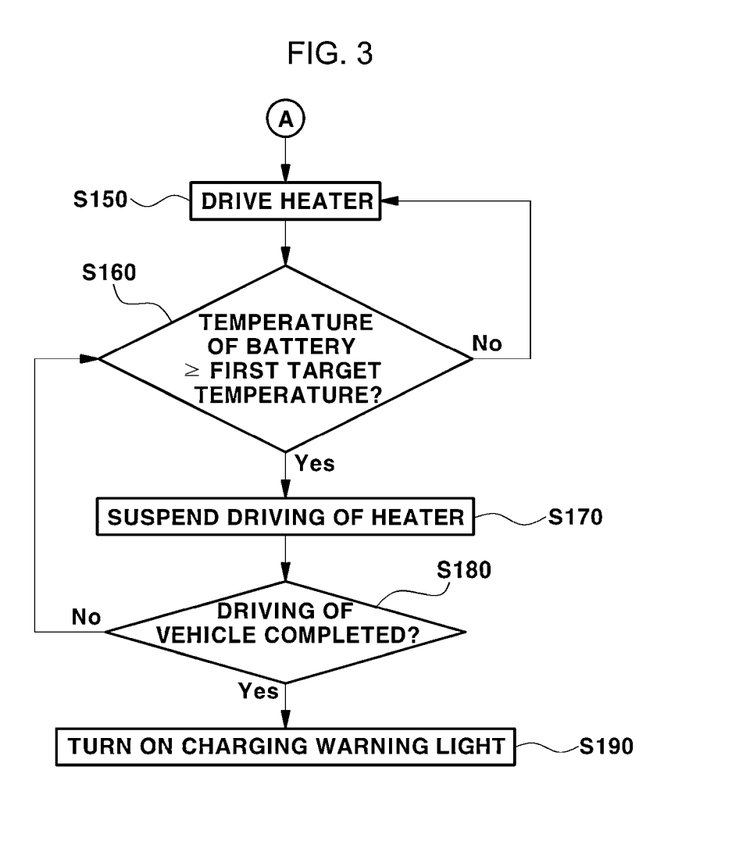
Figure 4:
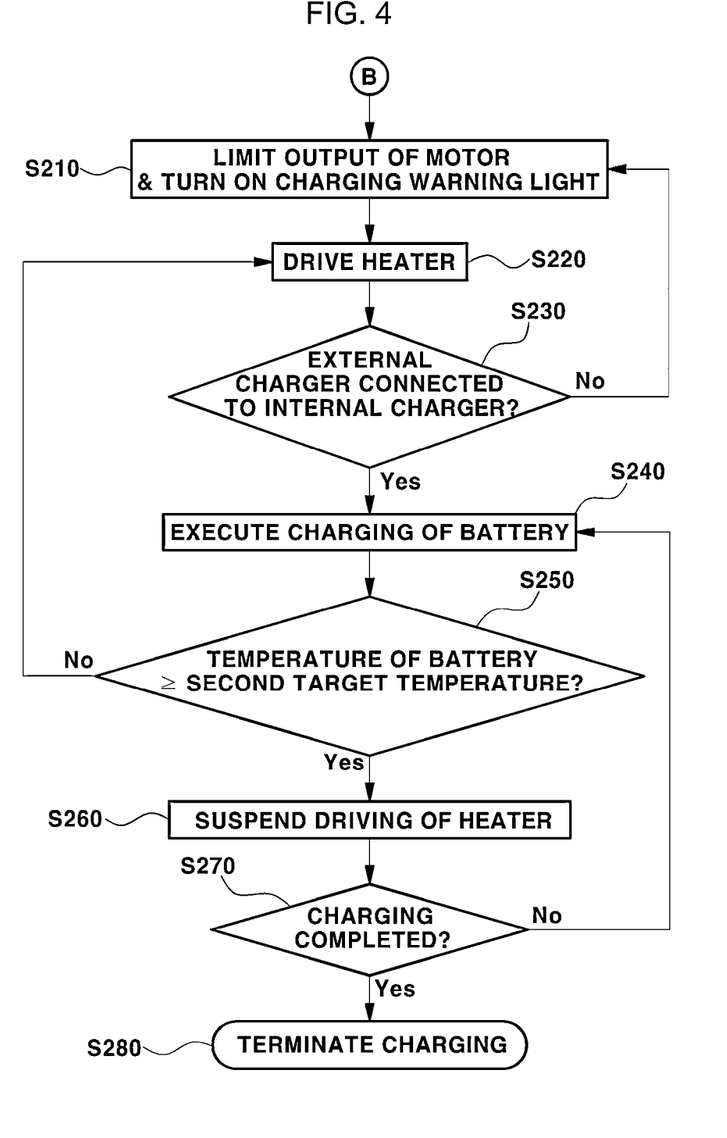
Figure 5:
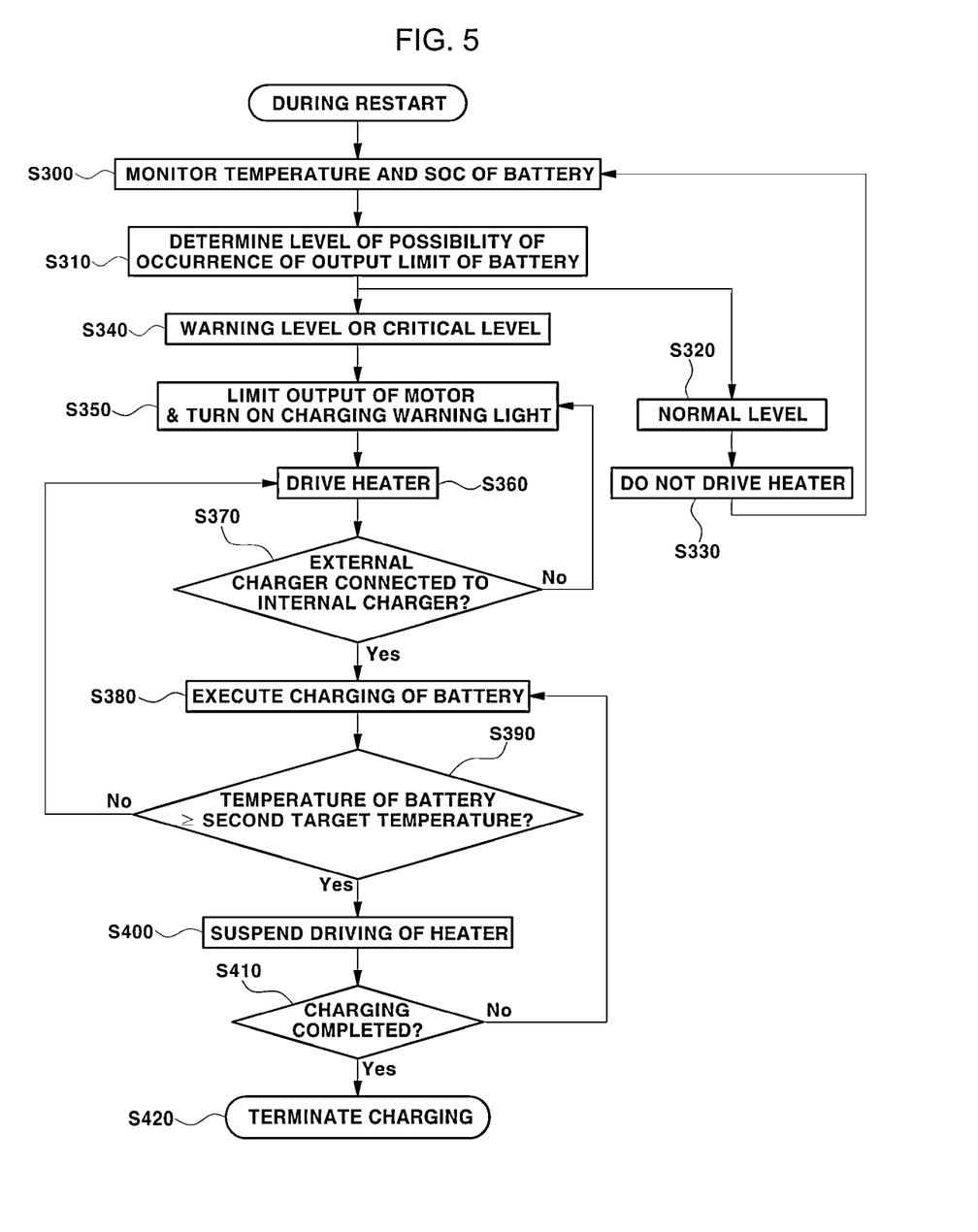

FIG. 1 is a block diagram illustrating a system for executing a method of preventing output limit of a battery of a vehicle according to various exemplary embodiments of the present disclosure, and FIG. 2, FIG. 3, FIG. 4 and FIG. 5 are flowcharts illustrating the method of preventing output limit of the battery of the vehicle according to various exemplary embodiments of the present disclosure. At the instant time, FIG. 3 illustrates a process of preventing output limit of the battery as an example when a possibility of occurrence of the output limit of the battery while driving is a warning level, FIG. 4 illustrates a process of preventing output limit of the battery as an example when a possibility of occurrence of the output limit of the battery while driving is a critical level, and FIG. 5 illustrates a process of preventing output limit of the battery as an example when a possibility of occurrence of the output limit of the battery during restarting is a warning level or a critical level.

As illustrated in FIG. 1, the system for executing the method of preventing output limit of the battery of the present disclosure includes a first controller 10, a second controller 20, a battery heating heater 30, and a dashboard 40.

The first controller 10 collects battery state information detected through a battery temperature sensor, a battery current sensor, and a battery voltage sensor provided in the vehicle, and is configured to control output and charging of the battery based on the collected information. The first controller 10 may be a battery management system (BMS) previously provided in the vehicle to collect state information of the battery and control the operation of the battery.

The second controller 20 detects a driving environment of the heater 30 according to a state of the battery through communication with the first controller 10 and requests that the first controller 10 drive the heater 30 as necessary. Furthermore, the second controller 20 is configured to control an operation of the dashboard 40 to provide a predetermined alarm to a user. Here, the second controller 20 may be a vehicle control unit (VCU) previously provided in the vehicle to perform overall control of the vehicle.

The heater 30 is driven by receiving a driving control signal from the first controller 10, and is configured to increase the temperature of the battery when the heater 30 is driven. The dashboard 40 operates to display information which may be visually confirmed by the user inside the vehicle.

Furthermore, the second controller 20 is configured to determine a driving state of the vehicle based on position information of a gearshift and speed information of the vehicle. When the gearshift is located at a drive position, the vehicle is determined to be in motion. When the gearshift is located at the drive position, the vehicle is determined to be in motion even if the vehicle speed is zero. Furthermore, when the gearshift is located at a park position and the vehicle speed is zero, the vehicle is determined to be parked. Furthermore, the second controller 20 is configured to determine whether the vehicle is restarted after parking. For example, the second controller 20 is configured to determine whether to start the vehicle based on information collected from a starting system of the vehicle.

The second controller 20 is configured to determine whether to drive the heater 30 based on the state information of the battery transmitted from the first controller 10. The second controller 20 receives the state information such as temperature and SOC value of the battery from the first controller 10. The second controller 20 monitors the state information of the battery in real time and is configured to determine whether there is a possibility that output limit of the battery occurs based on the monitored state information of the battery. In other words, the second controller 20 is configured to determine the possibility of occurrence of the output limit of the battery based on the monitored state information of the battery.

The second controller 20 is configured to determine a level of the possibility of occurrence of output limit according to the temperature and SOC value of the battery using a predetermined level determination map. The level determination map is configured to determine the level of the possibility of occurrence of the output limit of the battery based on the temperature and SOC value of the battery, and is stored in the second controller 20.

The level determination map may be constructed based on a result of evaluation through an experiment in advance. The level determination map may be constructed based on a result of evaluating discharge output characteristics of the battery according to the temperature and SOC value of the battery. For example, an SOC value at which discharge output of the battery is limited according to the temperature of the battery may be derived through an experiment and evaluation.

The level determination map is configured to determine the level of the possibility of occurrence of the output limit of the battery according to a result of combining a temperature region and an SOC region in which output performance of the battery is reduced. For example, the level determination map may be configured to determine the level of the possibility of occurrence of the output limit of the battery as shown in the following Table 1.

TABLE 1

| temperature | SOC | | |
| --- | --- | --- | --- |
| | less than 10% | 10~20% | 20~30% |
| 0° C. or more | warning | normal | normal |
| −10° C.~0° C. | critical | warning | normal |
| −20° C.~−10° C. | critical | critical | warning |

Referring to Table 1, the SOC value required to drive the heater 30 varies according to the temperature of the battery. At the instant time, when the level of the possibility of occurrence of the output limit of the battery is a warning level or a critical level, the second controller 20 requests that the first controller 10 drive the heater 30 to control the temperature increase of the battery.

In more detail, when the temperature of the battery is 0° C. or more, and the SOC value of the battery is less than 10%, the second controller 20 is configured to determine that the battery has entered the warning level. In other words, when the temperature of the battery is 0° C. or more, and the SOC value of the battery is less than 10%, the second controller 20 is configured to determine that the possibility of occurrence of the output limit of the battery has reached the warning level. Furthermore, when the temperature of the battery is −0° C. or more, and the SOC value of the battery is 10% or more, the second controller 20 is configured to determine that the possibility of occurrence of the output limit of the battery is a normal level.

Furthermore, when the temperature of the battery is −10° C. or more and less than −0° C., and the SOC value of the battery is less than 10%, the second controller 20 is configured to determine that the possibility of occurrence of the output limit of the battery has reached the critical level. Furthermore, when the temperature of the battery is −10° C. or more and less than −0° C., and the SOC value of the battery is 10% or more and less than 20%, the second controller 20 is configured to determine that the possibility of occurrence of the output limit of the battery has reached the warning level. When the SOC value of the battery is 20% or more and less than 30%, the second controller 20 is configured to determine that the possibility of occurrence of the output limit of the battery is the normal level.

Furthermore, when the temperature of the battery is −20° C. or more and less than −10° C., and the SOC value of the battery is less than 20%, the second controller 20 is configured to determine that the possibility of occurrence of the output limit of the battery has reached the warning level. When the SOC value of the battery is 20% or more and less than 30%, the second controller 20 is configured to determine that the possibility of occurrence of the output limit of the battery has reached the warning level.

Furthermore, although not shown in Table 1, when the temperature of the battery is −10° C. or more and less than −0° C., and the SOC value of the battery is 30% or more, the second controller 20 is configured to determine that the possibility of occurrence of the output limit of the battery is the normal level. Furthermore, when the temperature of the battery is −20° C. or more and less than −10° C., and the SOC value of the battery is 30% or more, the second controller 20 is configured to determine that the possibility of occurrence of the output limit of the battery is the normal level.

Meanwhile, since there is a time required for the heater 30 to increase the temperature of the battery to a predetermined target temperature, when constructing the level determination map, the time required for the temperature increase is considered to determine an SOC region of the battery in which operation of the heater 30 is required. In other words, when an experiment and evaluation are conducted to derive an SOC value for limiting discharge output of the battery according to the temperature of the battery, an SOC region of the battery in which operation of the heater 30 is required is determined to be a value higher than an actual SOC value for limiting discharge output of the battery, and the level determination map is constructed.

Accordingly, when occurrence of the output limit of the battery is predicted through the level determination map, the temperature of the battery is increased in advance, preventing a decrease in output due to a decrease in SOC value of the battery while driving. The target temperature may be determined to be a minimum temperature value (that is, a first target temperature) at which output limit of the battery does not occur based on the same SOC value, or may be determined to be a minimum temperature value (that is, a second target temperature) for maintaining a charging speed at a predetermined normal speed or greater during charging of the battery. The second target temperature is a temperature value for not causing output limit of the battery based on the same SOC value.

Upon determining that the possibility of occurrence of the output limit of the battery has entered the warning level, the second controller 20 drives the heater 30 until the temperature of the battery reaches the first target temperature. Furthermore, when the temperature of the battery reaches the first target temperature, the second controller 20 suspends driving of the heater 30. The first target temperature is a temperature value at which output limit of the battery does not occur while driving, and may vary according to the SOC value of the battery. The first target temperature is determined to be a temperature value at which a level of the possibility of occurrence of the output limit of the battery may be switched from the warning level to the normal level based on the same SOC (see Table 1).

Referring to Table 1, when the SOC value of the battery is 15%, the first target temperature may be determined to be 0° C. or more, and when the SOC value of the battery is 20% or more, the first target temperature may be determined to be −10° C. or more.

Furthermore, upon determining that the level of the possibility of occurrence of the output limit of the battery is the warning level, the second controller 20 drives the vehicle in a limp home mode to decrease discharging of the battery, reducing the possibility of occurrence of the output limit of the battery, and turns on a charging warning light 42 provided on the dashboard 40 to actively request charging of the battery. Furthermore, at the instant time, the second controller 20 drives the heater 30 until the temperature of the battery reaches the second target temperature. The second controller 20 suspends driving of the heater 30 when the temperature of the battery reaches the second target temperature. The second target temperature is determined as a temperature value at which the battery is most efficiently charged. Furthermore, the limp home mode is a type of safe mode for reducing discharging of the battery by limiting output of the vehicle (that is, output of the motor 50) to predetermined output or less than the predetermined output.

When the temperature of the battery rises and reaches the first target temperature or the second target temperature, the second controller 20 is configured to determine that the possibility of occurrence of the output limit of the battery occurring is reduced. The second controller 20 selectively raises the temperature of the battery to the first target temperature or the second target temperature according to the level of the possibility of occurrence of the output limit of the battery, and then turns off the operation of the heater 30.

Furthermore, when driving of the vehicle is completed in a situation in which the possibility of occurrence of the output limit of the battery reaches the warning level, and when the gearshift is positioned at the park position (that is, when the vehicle is parked), the second controller 20 induces the user to charge the battery through the charging warning light 42 provided on the dashboard 40. At the instant time, the second controller 20 induces charging of the battery by turning on the charging warning light 42 in a first operation mode. When the charging warning light 42 is turned on in the first operation mode, the charging warning light 42 may be turned on in yellow.

By turning on the charging warning light 42 in the first operation mode, the second controller 20 informs the user that the battery needs to be charged before restarting the vehicle, and induces the user to charge the battery. Thereafter, when the user charges the battery, occurrence of the output limit of the battery may be prevented even when the battery is not heated through the heater 30 during restarting.

Meanwhile, when the battery is not charged after the charging warning light 42 is turned on, the second controller 20 is configured to perform control to prevent abnormal stopping due to limited discharge output of the battery while driving when the vehicle is restarted. When the vehicle is restarted, the second controller 20 limits output of the motor 50 to a predetermined output value or less, turns on the charging warning light 42, and drives the heater 30 at the same time, preventing abnormal stopping.

When the battery is maintained at a low temperature for a long time due to prolonged parking, an output limit situation of the battery may occur even when the heater 30 is driven. A reason therefor is that, even when the heater 30 is driven, it takes time for the battery to reach a target temperature by the heater 30. Accordingly, even when the vehicle is restarted, if the possibility of occurrence of the output limit of the battery is the warning level or the critical level, the second controller 20 limits output of the motor 50 for driving the vehicle to predetermined output or less than the predetermined output, turns on the charging warning light 42, and drives the heater 30 at the same time.

The second controller 20 monitors the temperature and SOC value of the battery when the vehicle is restarted. In other words, the second controller 20 monitors the temperature and SOC value of the battery before restarting driving of the vehicle. Accordingly, the second controller 20 is configured to determine the level of the possibility of occurrence of the output limit of the battery using the level determination map based on the monitored temperature and the monitored SOC value of the battery. That is, when the vehicle is restarted, the second controller 20 predicts and is configured to determine whether output limit occurs according to the temperature and SOC value of the battery using the level determination map.

When the level of the possibility of occurrence of the output limit of the battery is the warning level or the critical level, the second controller 20 predicts that output limit of the battery will occur. The second controller 20 drives the vehicle in the limp home mode and turns on the charging warning light 42 of the dashboard 40 when occurrence of the output limit of the battery is predicted during restart of the vehicle. When the vehicle is driven in the limp home mode, output of the motor 50 is limited to predetermined output or less than the predetermined output, and thus SOC reduction of the battery decreases.

Furthermore, the second controller 20 raises the temperature of the battery to the second target temperature for optimizing a charging speed when charging the battery by driving the heater 30 when the vehicle is restarted. When the temperature of the battery is lower than the second target temperature, the charging speed of the battery may be reduced. The second controller 20 raises the temperature of the battery to the second target temperature, minimizing the risk of occurrence of the output limit of the battery during movement of the vehicle for charging the battery.

Upon determining that the temperature of the battery reaches the second target temperature and that the charging speed of the battery may be ensured at a predetermined normal speed, the second controller 20 suspends driving of the heater 30. The second target temperature may be determined as a temperature value greater than the first target temperature.

According to an exemplary embodiment of the present disclosure, the first controller 10 and the second controller 20 may be implemented as separate semiconductor circuits. Alternatively, the first controller 10 and the second controller 20 may be implemented as a single integrated semiconductor circuit.

Hereinafter, a method of preventing output limit of the battery according to an exemplary embodiment of the present disclosure will be described with reference to FIG. 2, FIG. 3, FIG. 4 and FIG. 5. At the instant time, it should be noted that the method of preventing output limit of the battery according to an exemplary embodiment of the present disclosure is not necessarily limited to processes or sequences shown in FIG. 2, FIG. 3, FIG. 4 and FIG. 5.

Referring to FIG. 2, while the vehicle is driven, the second controller 20 monitors the temperature and SOC value of the battery in real time (S100). The second controller 20 predicts and is configured to determine the possibility of occurrence of the output limit of the battery based on the monitored temperature and the monitored SOC value of the battery (S110). At the instant time, the second controller 20 is configured to determine the level of the possibility of occurrence of the output limit of the battery using the level determination map.

Upon determining that the level of the possibility of occurrence of the output limit of the battery is the normal level (S120), the second controller 20 does not drive the heater 30 (S130) and maintains a normal driving mode. Furthermore, when the level of the possibility of occurrence of the output limit of the battery is the normal level, the second controller 20 periodically monitors the temperature and SOC value of the battery.

Meanwhile, upon determining that the level of the possibility of occurrence of the output limit of the battery is the warning level (S140), the second controller 20 drives the heater 30 to raise the temperature of the battery as shown in FIG. 3 (S150).

Next, the second controller 20 compares the temperature of the battery with the first target temperature (S160). When the temperature of the battery reaches the first target temperature, the second controller 20 suspends driving of the heater 30 (S170). By driving the heater 30 until the temperature of the battery reaches the first target temperature, it is possible to prevent the battery from reaching a state in which output limit may occur while driving. The second controller 20 continues to drive the heater 30 when the temperature of the battery does not reach the first target temperature.

Next, the second controller 20 is configured to determine whether or not driving of the vehicle is completed based on position information of the gearshift (S180). The second controller 20 is configured to determine that driving of the vehicle is completed upon determining that the gearshift is moved from the drive position to the park position. Furthermore, when the gearshift is positioned at the drive position, the second controller 20 is configured to determine that the vehicle continues to be driven, continuously monitors the temperature of the battery, and compares the temperature with the first target temperature.

Upon determining that driving of the vehicle is completed, the second controller 20 turns on the charging warning light 42 for warning of a charging state of the battery (S190). The second controller 20 notifies the user that the battery needs to be charged before starting next driving by turning on the charging warning light 42 in the first operation mode and induces charging. Furthermore, by turning on the charging warning light 42, the second controller 20 may warn the user that the possibility of occurrence of the output limit of the battery may increase during next driving when the battery is not charged before starting next driving.

Furthermore, upon determining that the level of the possibility of occurrence of the output limit of the battery is the critical level while driving (S200), as illustrated in FIG. 4, the second controller 20 limits output of the motor 50 to a predetermined torque value or less, and turns on the charging warning light 42 (S210).

A possibility that the battery reaches an output limit state becomes higher in the case where the possibility of occurrence of the output limit of the battery is the critical level than in the case where the possibility of occurrence of the output limit of the battery is the warning level. Accordingly, the second controller 20 decreases SOC reduction of the battery by limiting output of the motor 50, and at the same time, turns on the charging warning light 42 to warn the user of the charging state of the battery and actively request charging of the battery. At the instant time, the charging warning light 42 is controlled in a second operation mode and turned on in red.

Furthermore, the second controller 20 drives the heater 30 before the user starts charging the battery (S220). That is, before charging of the battery starts, pre-conditioning of increasing the temperature of the battery is performed. by driving the heater 30, the charging speed of the battery is prevented from being lower than a predetermined normal speed due to the low temperature of the battery, and the charging speed of the battery is ensured at a normal speed or greater.

Thereafter, the second controller 20 is configured to determine whether or not an external charger of a charging station is connected to an internal charger of the vehicle (S230). The second controller 20 executes charging of the battery when the external charger is connected to the internal charger (S240). The internal charger is a charger provided in the vehicle to charge the battery, and the external charger is a charger provided in the charging station to supply charging power to a charging target.

When charging of the battery starts, the second controller 20 compares the temperature of the battery with the second target temperature (S250). Upon determining that the temperature of the battery has reached the second target temperature even before charging of the battery is completed, the second controller 20 suspends driving of the heater 30 (S260). When the temperature of the battery is less than the second target temperature, the second controller 20 continues to drive the heater 30.

Furthermore, the second controller 20 monitors in real time whether charging of the battery is completed (S270). For example, the second controller 20 may be configured to determine whether the battery is fully charged based on the SOC value of the battery. At the instant time, when the SOC value of the battery reaches a predetermined set SOC value, the second controller 20 may be configured to determine that charging of the battery is completed. The set SOC value may be set to 100% or to a value less than 100%.

Upon determining that charging of the battery is completed, the second controller 20 terminates charging of the battery (S280). For example, the second controller 20 may cut off supply of charging power to the battery through the external charger by disconnecting electrical connection between the internal charger and the external charger.

Meanwhile, when the vehicle is restarted after being parked, the second controller 20 monitors the temperature and SOC value of the battery in real time as shown in FIG. 5 (S300). The second controller 20 predicts and is configured to determine the possibility of occurrence of the output limit of the battery based on the monitored temperature and the monitored SOC value of the battery (S310). At the instant time, the second controller 20 utilizes the level determination map.

Upon determining that the level of the possibility of occurrence of the output limit of the battery is the normal level (S320), the second controller 20 does not drive the heater (S330), and is configured to control the vehicle in the normal driving mode. Furthermore, the second controller 20 periodically monitors the temperature and SOC value of the battery when the possibility of occurrence of the output limit of the battery is the normal level (S300).

Upon concluding that the level of the possibility of occurrence of the output limit of the battery is the warning level or the critical level (S340), the second controller 20 limits output of the motor 50 to a predetermined output value or less and turns on the charging warning light 42 (S350).

The possibility of occurrence of the output limit of the battery being the warning level or the critical level during restart of the vehicle means that the user does not charge the battery even though the charging warning light 42 is turned on when the vehicle is parked. Accordingly, the second controller 20 turns on the charging warning light 42 in the second operation mode for requesting charging of the battery even when the possibility of occurrence of the output limit of the battery is the warning level, warning the user of the charging state of the battery again to cause the user to recognize that charging of the battery is necessary.

Furthermore, the second controller 20 drives the heater 30 before the user starts charging the battery (S360). When the heater 30 is driven before charging of the battery starts, the charging speed of the battery is prevented from being lowered due to the low temperature of the battery, and the charging speed of the battery is ensured at a normal speed or greater.

Thereafter, the second controller 20 is configured to determine whether the external charger of the charging station is connected to the internal charger of the vehicle (S370). The second controller 20 executes charging of the battery when the external charger is connected to the internal charger (S380).

When charging of the battery starts, the second controller 20 compares the temperature of the battery with the second target temperature (S390). Upon determining that the temperature of the battery has reached the second target temperature even before charging of the battery is completed, the second controller 20 suspends driving of the heater 30 (S400). When the temperature of the battery is less than the second target temperature, the second controller 20 continues to drive the heater 30.

Furthermore, the second controller 20 monitors in real time whether charging of the battery is completed (S410). Upon determining that charging of the battery is completed, the second controller 20 terminates charging of the battery (S420). At the instant time, the second controller 20 is configured to determine that charging of the battery is completed when the SOC value of the battery reaches a predetermined set SOC value.

According to the means for solving the above problems, the present disclosure may prevent discharge output of the battery in a low temperature state from being limited according to SOC reduction by selectively and actively raising the temperature of the battery according to the possibility of occurrence of the output limit of the battery.

Accordingly, the present disclosure may prevent a situation in which discharge output of the battery is abruptly limited when the vehicle is driven or restarted, ensuring safety of the user and increasing driving safety and marketability of the vehicle.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless particularly stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, portions, or combinations thereof described in the specification are present, and does not preclude the possibility of addition or presence of one or more other features, numbers, steps, operations, elements, portions, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain predetermined principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of preventing output limit of a battery of a vehicle, the method comprising:
monitoring, by a processor, a temperature and a state of charge (SOC) value of the battery configured to supply power to a motor configured for driving the vehicle while driving of the vehicle;
determining, by the processor, a level of a possibility of occurrence of the output limit of the battery based on a level determination map configured based on the temperature and the SOC value of the battery; and selectively performing, by the processor, control for raising the temperature of the battery according to the determined level of the possibility of occurrence of the output limit of the battery, wherein the level of the possibility of occurrence of the output limit of the battery is determined as one of a normal level at which there is no possibility of occurrence of the output limit of the battery, a warning level at which there is the possibility of occurrence of the output limit of the battery, and a critical level at which the possibility of occurrence of the output limit of the battery is higher than the warning level, wherein when the level of the possibility of occurrence of the output limit of the battery is the warning level or the critical level, the method includes performing the control for raising the temperature of the battery is performed, wherein, in the normal level, the control for raising the temperature of the battery is not performed, and wherein the level determination map is configured to determine the level of the possibility of occurrence of the output limit of the battery based on the temperature and the SOC value of the battery.

2. The method of claim 1, wherein in the warning level, the control for raising the temperature of the battery is performed until the temperature of the battery reaches a first target temperature, and when the temperature of the battery reaches the first target temperature, the control for raising the temperature of the battery is suspended, and wherein the first target temperature is a minimum temperature at which the output limit of the battery does not occur based on a same SOC value.

3. The method of claim 1, wherein in the critical level, the control for raising the temperature of the battery is performed until the temperature of the battery reaches a second target temperature, and when the temperature of the battery reaches the second target temperature, the control for raising the temperature of the battery is suspended, and wherein the second target temperature is a minimum temperature for preventing a charging speed of the battery from being lower than a predetermined speed during charging of the battery.

4. The method of claim 1, wherein, in the critical level, output of the motor is limited to a predetermined output or less than the predetermined output.

5. The method of claim 1, further including turning on a charging warning light for selectively warning of a charging state of the battery according to the determined level of the possibility of occurrence of the output limit of the battery when the vehicle is parked.

6. The method of claim 5, wherein the turning on the charging warning light includes turning on the charging warning light in an operation mode for inducing charging of the battery in the warning level, and turning on the charging warning light in an operation mode for requesting charging of the battery in the critical level.

7. The method of claim 5, further including:

monitoring, by the processor, the temperature and the SOC value of the battery when the vehicle is restarted;

determining, by the processor, the level of the possibility of occurrence of the output limit of the battery by the level determination map based on the monitored temperature and the monitored SOC value of the battery; and limiting, by the processor, output of the motor to a predetermined output or less than the predetermined output upon concluding that the level of the possibility of occurrence of the output limit of the battery is the warning level or the critical level.

8. The method of claim 7, wherein when the level of the possibility of occurrence of the output limit of the battery determined when the vehicle is restarted is the warning level or the critical level, the control of raising the temperature of the battery is performed until the temperature of the battery reaches a second target temperature, and wherein the second target temperature is a minimum temperature for preventing a charging speed of the battery from being lower than a predetermined speed.

9. A system for preventing output limit of a battery, the system comprising:

a processor configured for:

monitoring a temperature and a state of charge (SOC) value of the battery configured to supply power to a motor configured for driving the vehicle while driving of the vehicle;

determining a level of a possibility of occurrence of the output limit of the battery based on a level determination map configured based on the temperature and the SOC value of the battery; and selectively performing control for raising the temperature of the battery according to the determined level of the possibility of occurrence of the output limit of the battery; and a storage configured to store data and algorithms driven by the processor, wherein the level of the possibility of occurrence of the output limit of the battery is determined as one of a normal level at which there is no possibility of occurrence of the output limit of the battery, a warning level at which there is the possibility of occurrence of the output limit of the battery, and a critical level at which the possibility of occurrence of the output limit of the battery is higher than the warning level, wherein when the level of the possibility of occurrence of the output limit of the battery is the warning level or the critical level, the processor is configured for performing the control for raising the temperature of the battery, wherein, in the normal level, the control for raising the temperature of the battery is not performed, and wherein the level determination map is configured to determine the level of the possibility of occurrence of the output limit of the battery based on the temperature and SOC value of the battery.

10. The system of claim 9, wherein in the warning level, the control for raising the temperature of the battery is performed until the temperature of the battery reaches a first target temperature, and when the temperature of the battery reaches the first target temperature, the control for raising the temperature of the battery is suspended, and wherein the first target temperature is a minimum temperature at which the output limit of the battery does not occur based on a same SOC value.

11. The system of claim 9, wherein in the critical level, the control for raising the temperature of the battery is performed until the temperature of the battery reaches a second target temperature, and when the temperature of the battery reaches the second target temperature, the control for raising the temperature of the battery is suspended, and wherein the second target temperature is a minimum temperature for preventing a charging speed of the battery from being lower than a predetermined speed during charging of the battery.

12. The system of claim 9, wherein, in the critical level, output of the motor is limited to a predetermined output or less than the predetermined output.

13. The system of claim 9, wherein the processor is further configured for turning on a charging warning light for selectively warning of a charging state of the battery according to the determined level of the possibility of occurrence of the output limit of the battery when the vehicle is parked.

14. The system of claim 13, wherein the turning on the charging warning light includes turning on the charging warning light in an operation mode for inducing charging of the battery in the warning level, and turning on the charging warning light in an operation mode for requesting charging of the battery in the critical level.

15. The system of claim 13, wherein the processor is further configured for:

monitoring the temperature and the SOC value of the battery when the vehicle is restarted;

determining the level of the possibility of occurrence of the output limit of the battery by the level determination map based on the monitored temperature and the monitored SOC value of the battery; and limiting output of the motor to a predetermined output or less than the predetermined output upon concluding that the level of the possibility of occurrence of the output limit of the battery is the warning level or the critical level.

16. The system of claim 15, wherein when the level of the possibility of occurrence of the output limit of the battery determined when the vehicle is restarted is the warning level or the critical level, the control of raising the temperature of the battery is performed until the temperature of the battery reaches a second target temperature, and wherein the second target temperature is a minimum temperature for preventing a charging speed of the battery from being lower than a predetermined speed.

* * * * *